US008577938B2

(12) United States Patent
Yeh et al.

(10) Patent No.: US 8,577,938 B2
(45) Date of Patent: Nov. 5, 2013

(54) DATA MAPPING ACCELERATION (75) Inventors: Peter Z. Yeh, San Jose, CA (US); Kunal Verma, Sunnyvale, CA (US); Reymonrod Vasquez, Vallejo, CA (US); Harsha Kumar Srivatsa, Fremont, CA (US); Mark Gilbert Kobe, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 153 days.

(21) Appl. No.: 13/215,775

(22) Filed: Aug. 23, 2011

(65) Prior Publication Data

US 2013/0054605 A1 Feb. 28, 2013

(51) Int. Cl.
*G06F 17/00* (2006.01)
(52) U.S. Cl.
USPC ........... 707/821; 707/687; 707/705; 707/709; 707/813; 707/964
(58) Field of Classification Search
USPC .................. 707/687, 705, 709, 813, 821, 964
See application file for complete search history.

(56) References Cited

U.S. PATENT DOCUMENTS

| 2004/0024790 | A1* | 2/2004 | Everett ........................ 707/200 |
| 2005/0060332 | A1 | 3/2005 | Bernstein et al. |
| 2006/0077444 | A1* | 4/2006 | Lum et al. .................... 358/1.15 |
| 2006/0080299 | A1 | 4/2006 | Shimogori et al. |

OTHER PUBLICATIONS

Salvatore, Raunich, et al., "ATOM: Automatic target-driven ontology merging" Data Engineering (ICDE), 2011 IEEE 27TH International Conference on, IEEE, Apr. 11, 2011, pp. 1276-1279, XP031868465, DOI: 10.1109/ICDE.2011.5767871, ISBN:9781424489596.
European Search Report for European Application No. 12005955.5-1225, European Patent Office, Dec. 3, 2012.

* cited by examiner

*Primary Examiner* — Sana Al Hashemi
(74) *Attorney, Agent, or Firm* — Mannava & Kang, P.C.

(57) ABSTRACT

A data mapping acceleration system may include a syntactic profile module to generate a syntactic profile of a data source to be mapped. A semantic classification module may generate a semantic classification of the data source. A similarity module may evaluate the syntactic profile and semantic classification to determine an overall similarity between attributes of data from the data source for mapping the data source.

16 Claims, 9 Drawing Sheets

DATA MAPPING ACCELERATION

BACKGROUND

Data mapping may include, for example, the creation of data element mappings between distinct data models. Data mapping may be performed manually on data sources, for example, by comparison and subjective interpretation of which column in a data source may map to a column in another data source. In many instances, manual mapping of data sources may not be viable given the size of data sources, which may include, for example, enterprise databases, and variability involved in the manual mapping, which can lead to inconsistent results.

BRIEF DESCRIPTION OF DRAWINGS

The embodiments are described with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent that the embodiments may be practiced without limitation to all the specific details. Also, the embodiments may be used together in various combinations.

1. Overview

A data mapping acceleration system may provide for automatic discovery and recommendation of mappings across disparate sources, such as, for example, enterprise data sources, which may include, for example, databases. Data mapping may include, for example, the creation of data element mappings between distinct data models. Data mapping may be used for a wide variety of data integration tasks, such as, for example, data warehousing, master data management (MDM), data transformation, identification of data relationships, discovery of hidden data, and consolidation of databases. For example, data mapping may include data transformation or data mediation between a data source and a destination. Identification of data relationships may include identification of relationships, for example, as part of data lineage analysis. Discovery of hidden data may include, for example, discovery of social security numbers hidden in a user ID as part of a data masking or de-identification project. Data mapping may also include consolidation of multiple databases into a single database and identification of redundant columns of data for consolidation or elimination. The data mapping acceleration system may discover mappings by applying text analytics and semantic technologies to a data model and values. The system may leverage, for example, user-specified knowledge sources that may be internal and/or public to further guide the mapping process.

The data mapping acceleration system may include a user interface module to input databases to be mapped. The modules and other components of the data mapping acceleration system may include machine readable instructions, hardware or a combination of machine readable instructions and hardware. The results of the mapping may be generated as data mapping results and displayed at the user interface module. A syntactic profile module may generate syntactic profiles of the databases that are to be mapped and store the syntactic profiles in a syntactic profile repository. The syntactic profile may include, for example, rules for the formation of grammatical sentences in a language, or patterns of formation of sentences and phrases from words. The syntactic profile may include token vectors. A glossary database may include glossaries, for example, including abbreviations and synonyms, that may be used to normalize tokens of the database. A semantic classification module may generate semantic classifications based on ontologies from an ontology database. The semantic classification may be related to, for example, the relationship between signifiers, such as words, phrases, signs and symbols, and what they stand for. The semantic classifications may be stored in a semantic classification repository. The semantic classification may include class vectors. The syntactic profiles and semantic classifications, respectively including the token and class vectors, may be analyzed by a similarity module to map the databases by determining, for example, a similarity between attributes of data from the databases being mapped. The similarity module may map the databases and generate semantic, syntactic and overall scores representing, for example, a level of the mapping. A post processing module may format the mappings based on user preferences, and forward the mapped databases as the data mapping results to the user interface module for display.

As described above, the data mapping acceleration system may thus include the syntactic profile module to generate a syntactic profile of a data source to be mapped. The semantic classification module may generate a semantic classification of the data source. The similarity module may evaluate the syntactic profile and semantic classification to determine an overall similarity between attributes of data from the data source for mapping the data source. The data source may be an enterprise database. The syntactic profile may include tokenized values for a column of the data from the data source. The tokenized values may be designated tokens, and the syntactic profile may include normalized tokens. The system may include a glossary for normalizing the tokens. The syntactic profile may include a token vector for a column of the data from the data source. The semantic classification may include classified values for a column of the data from the data source. The semantic classification may include a class vector for a column of the data from the data source. The overall similarity may include a component of a syntactic similarity and a semantic similarity.

A method for data mapping acceleration may include generating a syntactic profile of a data source to be mapped, generating a semantic classification of the data source, and evaluating the syntactic profile and semantic classification to determine an overall similarity between attributes of data from the data source for mapping the data source. The method may further include tokenizing values for a column of the data from the data source to determine the syntactic profile. The tokenized values may be designated tokens, and the method may further include normalizing the tokens. The method may include using a glossary for normalizing the tokens. The method may include generating a token vector for a column of the data from the data source to determine the syntactic profile. The method may include classifying values for a column of the data from the data source to determine the semantic classification. The method may include generating a class vector for a column of the data from the data source to determine the semantic classification. The method may include classifying values for a column of the data from the data source using keyword, pattern, rule and/or classifier based techniques. If a value of a column of the data from the data source includes multiple classifications, the method may include identifying subsumption relationships and retaining a specific subsumee for determining the semantic classification. The method may include generating syntactic profiles and semantic classifications for a plurality of data sources to be mapped and/or consolidated.

A non-transitory computer readable medium having stored thereon a computer executable program to provide data mapping acceleration, the computer executable program when executed may cause a computer system to generate a syntactic profile of a data source to be mapped, generate a semantic classification of the data source, and evaluate the syntactic profile and semantic classification to determine an overall similarity between attributes of data from the data source for mapping the data source.

As described in further detail below, in order to determine the syntactic profile for a database that is to be mapped, columns of the database to be mapped may be tokenized. Tokenization may include breaking a stream of text into words, phrases, symbols, or other meaningful elements called tokens. The tokens may be normalized using glossaries stored in the glossary database. The glossaries may include, for example, glossaries of abbreviations, synonyms etc. Based on the tokenization and normalization, token vectors may be generated and stored in the syntactic profile repository. A set of all the token vectors across all the columns of a database or all columns that are to be mapped may constitute the syntactic profile for a particular database.

As described below, in order to determine the semantic classification for a database that is to be mapped, a mapping ontology may be used with the semantic classification module. An ontology may formally represent knowledge as a set of concepts within a domain, and the relationships between those concepts. Ontology mapping may include the process of determining correspondence between concepts. An ontology may include hierarchal classes including sub-class and super class relationships between elements. A class may also include the attribute of including a lexical realization. For example, a class may include keywords that may identify the particular class. A class may further include the attribute of including a classification type. For example, a class may include pattern-based, keyword-based, rule-based and/or classifier-based classification types for mapping a database. Application of ontology mapping for semantic classification and examples thereof are described in further detail below.

In order to determine the semantic classification for a database that is to be mapped, for the columns of the database, classes from an ontology whose lexical realization matches the column name may be retrieved. If no classes are retrieved, then all classes from the ontology may be considered. For example, a class may include a life cycle realization, which may be the keywords that are used to identify the occurrence of that class. For a column in the database, the semantic classification module may first determine if any classes have keywords that appear in the name of that column. If yes, then the class may be added to a list, and if no, then that class may be bypassed.

The semantic classification module may classify values into applicable classes. As discussed above, classification methods may include, for example, keyword-based, pattern-based, rule-based, and/or classifier-based methods. If a value includes multiple classifications, as described below, the semantic classification module may identify any subsumption relationships and retain the most specific subsumee.

Based on the foregoing semantic classification procedures performed by the semantic classification module, class vectors may be generated and stored in the semantic classification repository. A set of all the class vectors across all columns that are to be mapped may constitute the semantic classification for a particular database.

The syntactic profile of a database stored in the syntactic profile repository and the semantic classification of a database stored in the semantic classification repository may be analyzed by the similarity module to map the databases by determining, for example, a similarity between attributes of data from the databases being mapped. Based on the level of similarity, the appropriate columns from the databases may be mapped.

The overall similarity may be used to determine, for example, a unified view of different databases, or to map databases to each other (e.g., map a source database to a target database). Based on the overall similarity, and/or based on a determination that the semantic and/or syntactic similarities exceed predetermined threshold values, the respective columns of databases may be mapped. For example, if the overall similarity exceeds a predetermined threshold, respective columns of databases may be mapped. Based on the overall similarity, databases may also be consolidated.

The data mapping acceleration system may reduce the cost associated with discovering mappings and relationships across data sources on enterprise initiatives ranging, for example, from MDM to legacy migration, data consolidation, collection of data migration versus acquisition, and data warehouse content. The system may reduce, for example, subjectivity and hence rework by replacing manual interpretation, which may be required when discovering mappings through data profiling, with an objective, data-driven approach. The system may automatically discover mappings beyond key relationships. The system may provide more accurate, robust discovery by considering both semantic and syntactic characteristics of data. The system may allow users to upload and define custom knowledge sources such as, for example, dictionaries, ontologies, etc., to further guide discovery. The system may provide for integration with vendor solutions such as, for example, INFORMATICA to enforce discovered mappings. The discovered mappings may be exported to a variety of formats such as, for example, VISIO diagrams, XML, etc. The system may also facilitate understanding, sharing, modification and management of discovered mappings through an intuitive and collaborative user interface.

The systems and methods described herein provide a technical solution to the technical problem of mapping and/or consolidation of data sources. In many instances, manual mapping of data sources is not a viable solution given the size of data sources and variability involved in the manual mapping, which can lead to inconsistent results. The systems and methods according to the embodiments provide the technical solution of objectively mapping data sources based on, for example, syntactic and semantic similarities that may be automatically calculated between columns of data sources to determine an overall similarity for a mapping.

2. System

Figure 1:
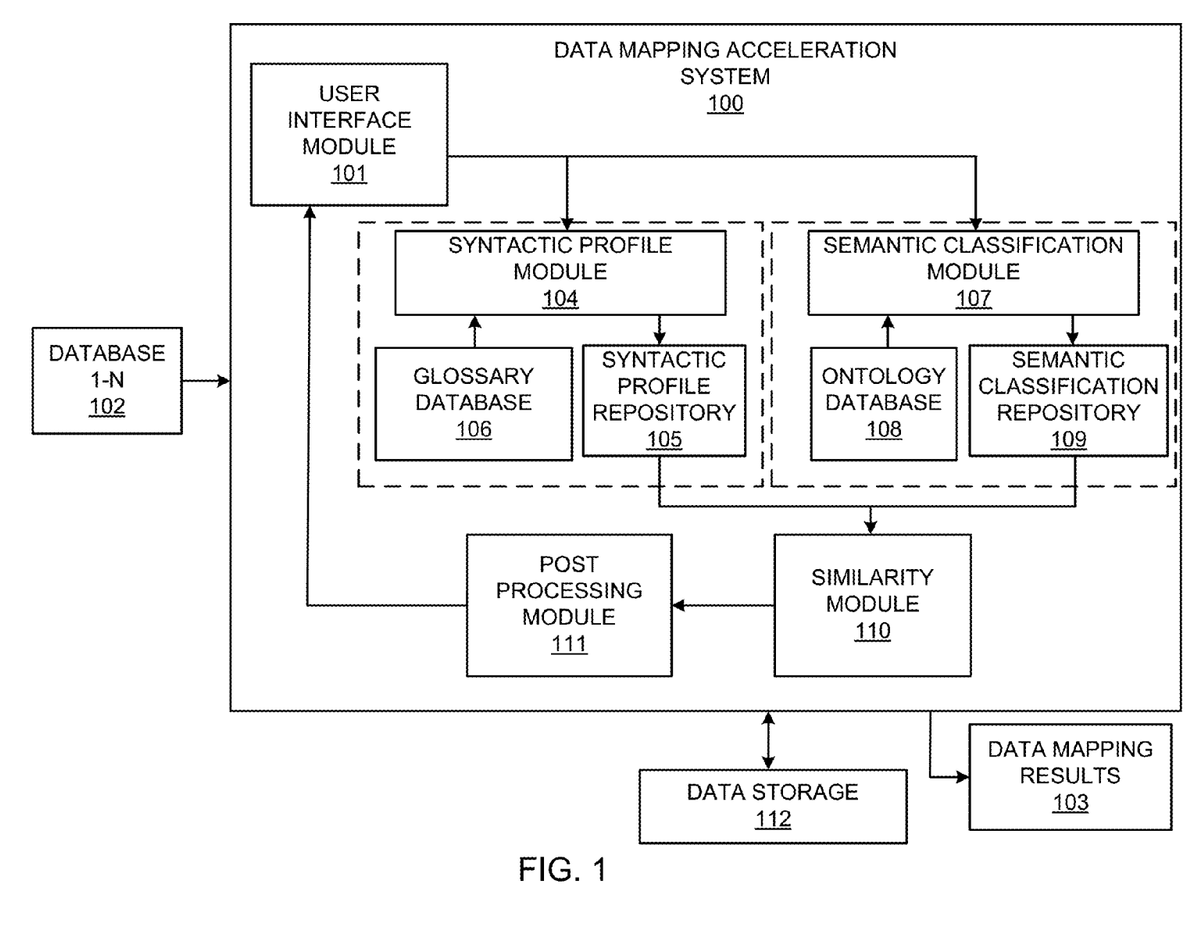
FIG. 1 illustrates a system diagram for a data mapping acceleration system, according to an embodiment.
Figure 2:
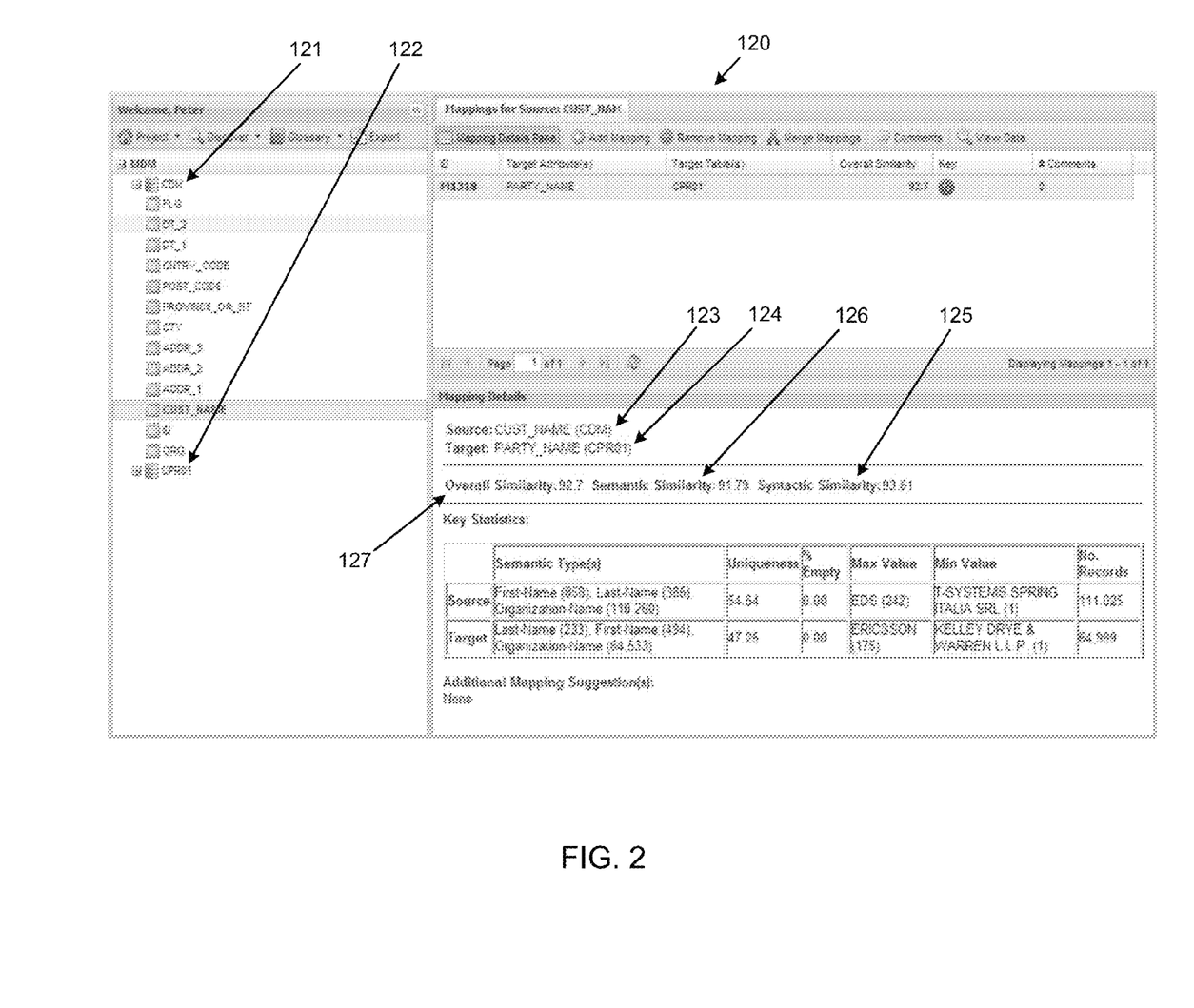
FIG. 2 illustrates an example of a screen display for the data mapping acceleration system, illustrating, for example, mapping of databases.

FIG. 1 illustrates a data mapping acceleration system 100, according to an embodiment. Referring to FIG. 1, the system 100 may include a user interface module 101 to input data sources, such as, for example, databases 102 to be mapped. The databases 102 may generally include databases 1-N that may be mapped. Moreover, the input to the user interface module 101 may include additional information, such as, for example, additional domain and/or industry specific ontologies, glossaries, etc. to map the databases 102, or information from a database that is to be mapped to other information within the same database. The results of the mapping may be generated as data mapping results 103 and displayed at the user interface module 101. A syntactic profile module 104 may generate syntactic profiles of the databases 102 that are to be mapped, and the syntactic profiles may be stored in a syntactic profile repository 105. As described below, the syntactic profiles may include token vectors. A glossary database 106 may include glossaries, for example, including abbreviations and synonyms, that may be used to normalize tokens of the databases. A semantic classification module 107 may generate semantic classifications based on ontologies from an ontology database 108. The semantic classifications may be stored in a semantic classification repository 109. The semantic classifications may include class vectors. The syntactic profiles and semantic classifications respectively including the token and class vectors, may be analyzed by a similarity module 110 to map the databases 102 by determining, for example, a similarity between attributes of data from the databases 102 being mapped. The similarity module 110 may map the databases 102 and generate semantic, syntactic and overall scores representing, for example, a level of the mapping. A post processing module 111 may format the mappings based on user preferences, and forward the mapped databases as the data mapping results 103 to the user interface module 101 for display. A data storage 112 may be provided for storing information utilized by the system 100, which may include, for example, information from the databases 102 being mapped and results of the database mapping at various stages. An example of a display 120 of mapped databases is shown in FIG. 2, and described in further detail below.

Figure 3:
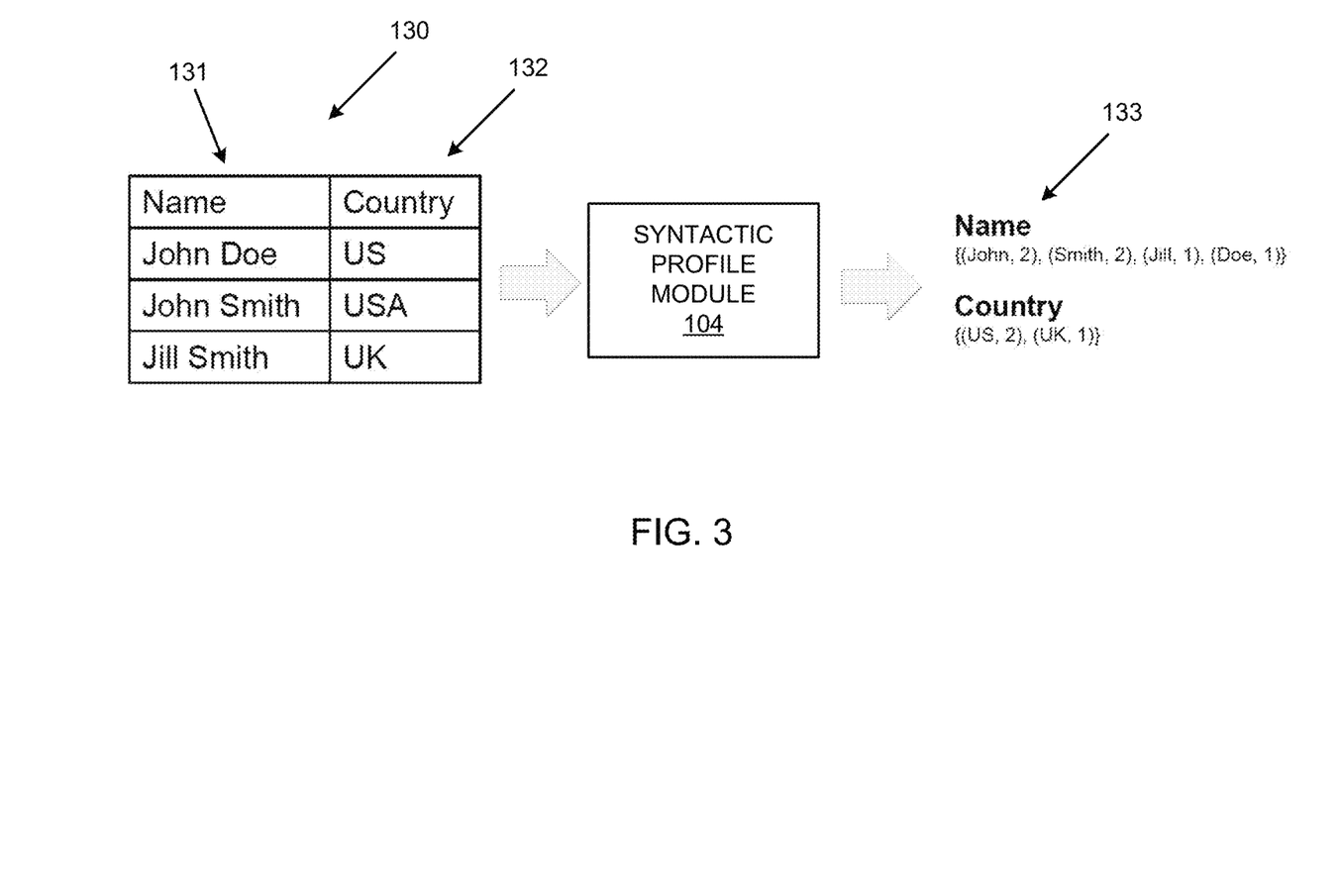
FIG. 3 illustrates an example of an operation of a syntactic profile module, according to an embodiment.

Referring to FIGS. 1 and 3, in order to determine the syntactic profile for a database that is to be mapped, the database 102 to be mapped may be input from the user interface module 101 to the syntactic profile module 104. For example, referring to FIG. 3, a database 130 may include columns "name" and "country", respectively, at 131, 132. Each value in the columns 131, 132 may be tokenized. As discussed above, tokenization may include breaking a stream of text into words, phrases, symbols, or other meaningful elements called tokens. For example, for column 131, the name "John Doe" may be tokenized into the tokens "John" and "Doe". Each token may be normalized using glossaries stored in the glossary database 106. The glossaries may include, for example, glossaries of abbreviations, synonyms etc. For example, the values "US" and "USA" may be normalized to "US", or alternatively, "US" may be normalized to "USA" depending on user preferences. The glossaries may be modified and updated as needed to include information needed for normalization. Based on the tokenization and normalization, token vectors 133 may be generated and stored in the syntactic profile repository 105. For the example of FIG. 3, each column 131, 132 may include a respective token vector. A set of all the token vectors across all the columns may constitute the syntactic profile for a particular database, which may be in a table format as shown in FIG. 3.

Figure 4:
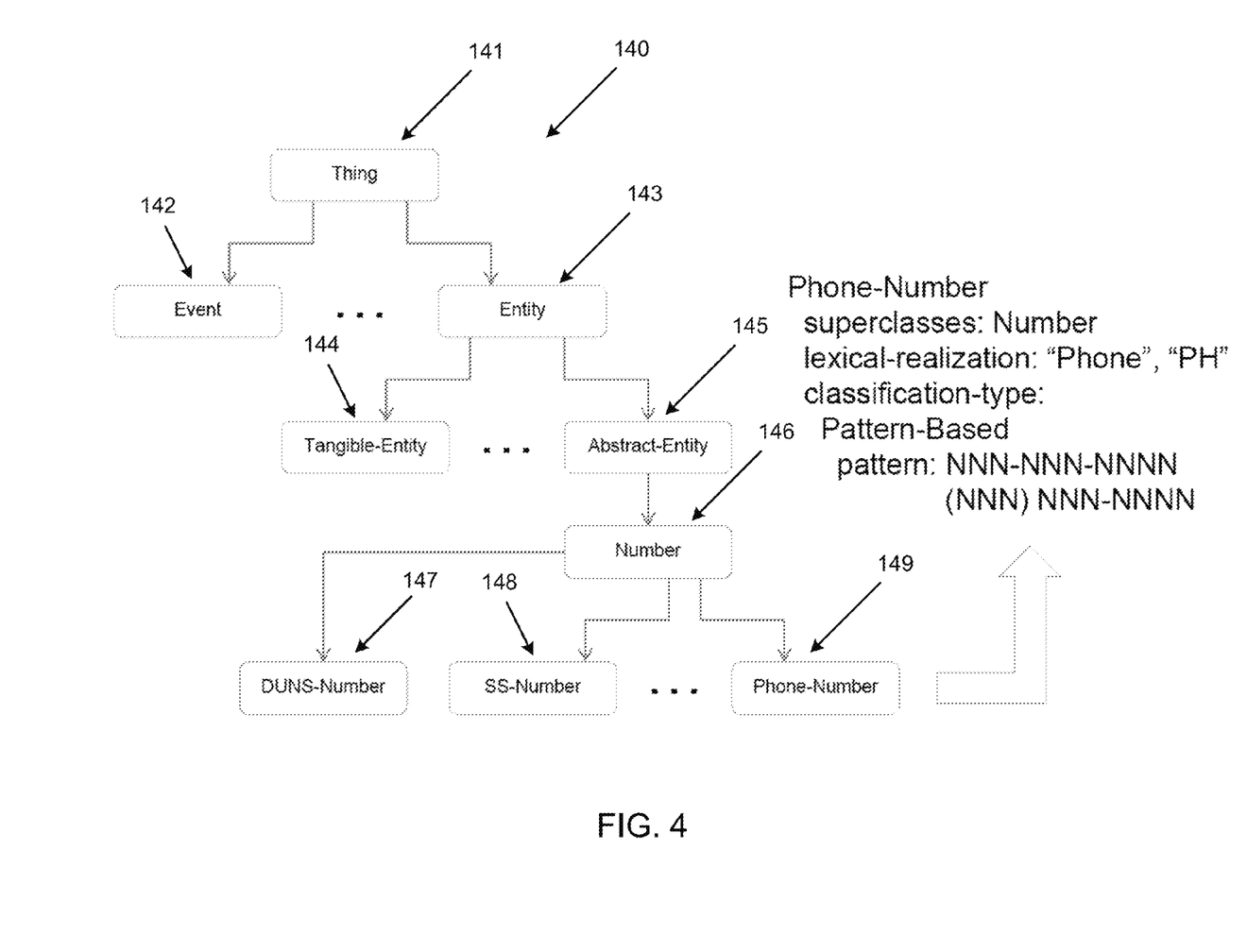
FIG. 4 illustrates an example of a mapping ontology for the data mapping acceleration system, according to an embodiment.
Figure 5:
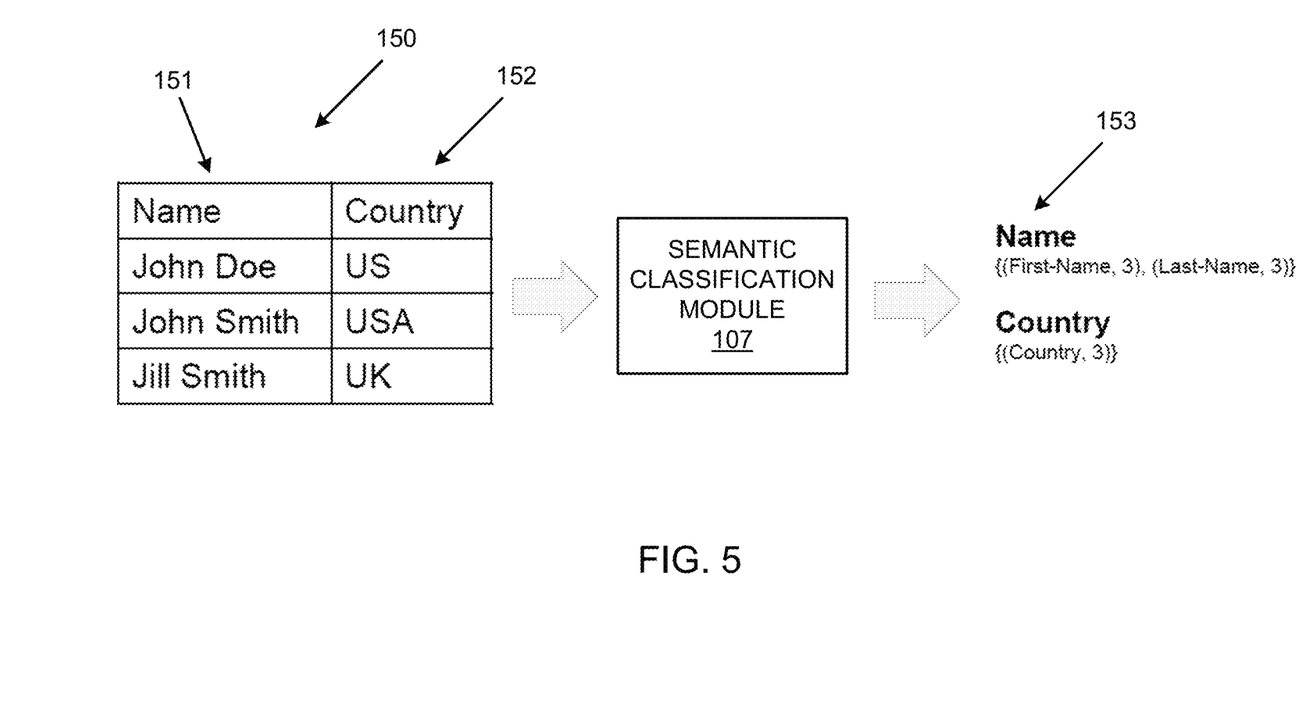
FIG. 5 illustrates an example of an operation of a semantic classification module, according to an embodiment.

Referring to FIGS. 1, 4 and 5, in order to determine the semantic classification for a database that is to be mapped, an example of a mapping ontology 140 for use with the semantic classification module 107 is illustrated. For the mapping ontology 140, the most general concept may be "thing" at 141, which may be separated into "event" and "entity", respectively at 142, 143. The "event" and "entity", respectively at 142, 143, may be further separated into various sub-classes. For example, "entity" may be separated into various types of entities, such as, for example, "tangible-entity" and "abstract-entity", respectively at 144, 145. For the example of FIG. 4, the "abstract-entity" at 145 may include a "number" at 146, which may be separated, for example, into various types of numbers, such as, for example, "DUNS-number", "SS-number" and "phone-number" at 147-149. Each class may include the attribute of including a super class as shown in FIG. 4. For example, "phone-number" may include the super class "number" which may include the super class "abstract-entity" etc. A class may also include the attribute of including a lexical realization. For example, a class may include keywords that may identify the particular class. For example, the class "phone-number" at 149 may include keywords, such as, for example, "phone" and "PH". A class may further include the attribute of including a classification type. For example, a class may include the pattern-based, keyword-based, rule-based and/or classifier-based classification types for mapping a database.

A pattern-based classification type is shown in FIG. 4, and may be based on a pattern of values. For example, in the FIG. 4 example, a first pattern may include three numbers, followed by a "-", followed by three numbers, followed by a "-", followed by four numbers (e.g., NNN-NNN-NNNN). Another pattern may include three numbers within parenthesis, followed by three numbers, followed by a "-", followed by four numbers (e.g., (NNN) NNN-NNNN). The patterns may be used to classify values of a particular column of a database to determine whether or not the value is a phone number.

A keyword-based classification type may compare keywords to values of a particular column of a database to determine whether or not a value matches a keyword. For example, for a column of a database including first names, the values of the column may be compared to a list of first names or common first name keywords (e.g., John, Peter etc.) to identify matches.

A rule-based classification type may classify values of a particular column of a database based on pre-defined rules. For example, a rule may specify that values within a particular range and including particular properties identify a zip code. For example, a rule may specify that values from 80000 to 81000 identify a zip code for a particular state.

A classifier-based classification type may use machine learning techniques to classify values of a particular column of a database. For example, a value of a particular column of a database may be compared to a previously determined classification to determine a match. For example, a classification may be used to determine whether a value is an individual or a company based on previously determined classifications.

Referring to FIGS. 1, 4 and 5, in order to determine the semantic classification for a database that is to be mapped, the database 102 to be mapped may be input from the user interface module 101 to the semantic classification module 107. For example, referring to FIG. 5, a database 150 may include columns "name" and "country", respectively, at 151, 152. For each column 151, 152 of the database 150, all classes from an ontology whose lexical realization matches the column name may be retrieved. If no classes are retrieved, then all classes from the ontology may be considered. For example, as discussed above with reference to FIG. 4, a class may include a life cycle realization, which may be the keywords that are used to identify the occurrence of that class. For example, as shown in FIG. 4, "number" may include the lexical-realization "phone" and "PH". Referring to FIG. 5, for a column in the database 150, the semantic classification module 107 may first determine if any classes have keywords that appear in the name of that column. If yes, then the class may be added to a list, and if no, then that class may be bypassed. The semantic classification module 107 may thus filter the number of classes in an ontology to a smaller subset of classes. As discussed above, if no classes are retrieved, then all classes from the ontology may be considered. However, if classes that actually have keywords that appear in names of the columns are available, then subsequent steps may be restricted to only those classes.

The semantic classification module 107 may classify a value into all applicable classes. For example, if it is determined that there are N classes that may be relevant based on the keyword names, then for each value, the module 107 may determine which of the classes each value belongs to. As discussed above, classification methods may include, for example, keyword-based, pattern-based, rule-based, and/or classifier-based methods.

If a value has multiple classifications, the semantic classification module 107 may identify any subsumption relationships and retain the most specific subsumee. If a value cannot be classified, the module 107 may identify the value, for example, as unknown. For example, assuming a term may be classified as either a company or a person's name (i.e., thus including multiple classifications), the semantic classification module 107 may identify any subsumption relationships and retain the most specific subsumee. For example, assuming a term may be classified as either a phone number or a number, since number may be considered a super class of phone number, the redundant class number may be discarded and the more specific phone number class may be retained. As discussed above, if a value cannot be classified, the module 107 may identify the value, for example, as unknown. For such unknown values, the module 107 may identify all classified values. For a class that may constitute a significant majority (e.g., a class that exceeds a predetermined threshold which may be adjustable), the unknown value may be assumed to be the class that makes up the significant majority.

Based on the foregoing semantic classification procedures performed by the semantic classification module 107, referring to FIG. 5, class vectors 153 may be generated and stored in the semantic classification repository 109. For the example of FIG. 5, each column 151, 152 may include a respective class vector. A set of all the class vectors across all the columns may constitute the semantic classification for a particular database, which may be in a table format as shown in FIG. 5, or include tables. Referring to FIG. 5, the class vector 153 for "name" may include "first name" and "last name". For example, "first name" may include members "John" "John" and "Jill". The class vector for "country" may include "country" whose members may include "US", "USA" and "UK".

The syntactic profile of the database 102 stored in the syntactic profile repository 105 and the semantic classification of the database 102 stored in the semantic classification repository 109 may be analyzed by the similarity module 110 to map the databases 102 by determining, for example, a similarity between attributes of data from the databases 102 being mapped. For example, assuming a first database includes a column called "country" and a second database includes a column called "nation", based on both the token and class vectors, the similarity between the "country" and "nation" columns may be determined. Based on the level of similarity as described below, the columns may be mapped. The similarity between attributes of data may be calculated using the following equations:

$$\beta e^{-\ln\left(1+\frac{F_A(\phi)+F_B(\phi)}{|K'_A|+|K'_B|}\right)} \frac{\sum_{k \in K_A \cup K_B} \sqrt{F_A(k)F_B(k)}}{\sqrt{\sum_{k \in K_A} F_A(k) \sum_{k \in K_B} F_B(k)}} \quad (1)$$

$$\alpha e^{-\ln\left(1+\frac{H(C'_A \cup C'_B)}{H(C'_A \cup C'_B)+1}\right)} \frac{\sum_{c \in C_A \cup C_B} \sqrt{P_A(c)P_B(c)}}{\sqrt{\sum_{c \in C_A} P_A(c) \sum_{c \in C_B} P_B(c)}} \quad (2)$$

Overall Similarity = Equation (1) + Equation (2)  (3)

Referring to Equations (1) and (2), Equation (1) may represent the syntactic similarity (excluding β) and Equation (2) may represent the semantic similarity (excluding α). The overall similarity may be determined by Equation (3) (i.e., Equation (1)+Equation (2)). For Equations (1) and (2), β and α may represent the syntactic and semantic weights respectively, and may add to 1.0. For Equation (1), $K'_X$ may represent all tokens (including null) from the token vector for attribute X, $K_X$ may represent the unique non-null tokens from the token vector for attribute X, and $F_X(k)$ may represent the number of times a token k occurs in attribute X according to the token vector for X. For Equation (2), $C'_X$ may represent the unique classes from the class vector for attribute X along with UNKNOWN, $C_X$ may represent the unique classes from the class vector for attribute X, $H(X)=-\Sigma P_v \log P_v$, and $P_X(c)$ may represent the number of times a class c occurs in attribute X according to the class vector for X.

Referring to Equations (1) and (2), the exponential term (i.e., $e^x$) may represent a discount factor. For Example, for Equation (1), the syntactic similarity may be discounted based on the number of null values per column. The higher the number of null values per column, the lower the degree of confidence and the higher the discount. Referring to Equation (2), the semantic similarity may be discounted in a similar manner. For example, for Equation (2), the discount factor may be based on the number of classes for a particular column. If a value can be classified to one class or a small number of classes, the classification may have a high degree of confidence. If so, the discount factor may minimally impact the semantic similarity. If however the values are classified to multiple classes, then the classification may have a low degree of confidence. In this case, the discount factor may have a greater impact on the semantic similarity.

As described above, assuming a first database includes a column called "country" and a second database includes a column called "nation", based on both the token and class vectors, the similarity between the "country" and "nation" columns may be determined. Referring to Equation (1), for the token vectors for the "country" and "nation" columns, $F_A(k)$ may represent the number of times a token k occurs in attribute A according to the token vector for A, where A may be "country", and $F_B(k)$ may represent the number of times a token k occurs in attribute B according to the token vector for B, where B may be "nation". Thus based on Equation (1), the syntactic similarity between the "country" and "nation" columns may be determined. In a similar manner, Equation (2) may be used to determine the semantic similarity between the "country" and "nation" columns. As discussed above, the overall similarity between the "country" and "nation" columns may be determined using Equation (3) (i.e., by adding Equations (1) and (2) weighted by β and α respectively).

The overall similarity may be used to determine, for example, a unified view of different databases, or to map databases to each other (e.g., map a source database to a target database). For example, referring to FIG. 2, as discussed above, an example of a display 120 of mapped databases is shown. The mapped databases may include a first database "CDM" and a second database "CPR01", respectively designated 121, 122. For mapping of the "CUST_NAME" and "PARTY_NAME" columns at 123, 124, the syntactic similarity at 125 determined by Equation (1) is 93.61%, the semantic similarity at 126 determined by Equation (2) is 91.79%, and the overall similarity at 127 determined by Equation (3) is 92.7%, assuming β and α are 0.5 each.

Based on the overall similarity, and/or based on a determination that the semantic and/or syntactic similarities exceed predetermined threshold values, the respective columns of databases may be mapped. For example, the contents of two columns whose syntactic, semantic and/or overall similarities exceed predetermined threshold values may be combined or otherwise consolidated to generate a single column. Assuming for example a threshold is set at 90%, if the overall similarity exceeds the threshold, respective columns of the databases being evaluated may be mapped.

3. Method

Figure 6:
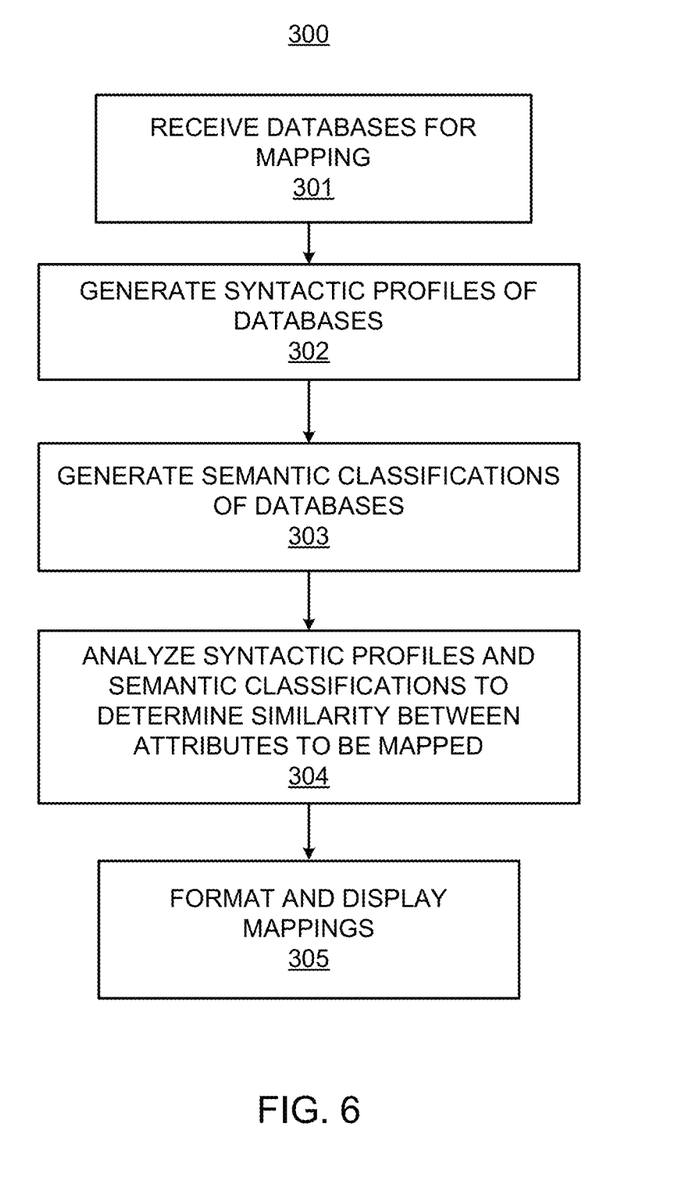
FIG. 6 illustrates a method for data mapping acceleration, according to an embodiment.
Figure 7:
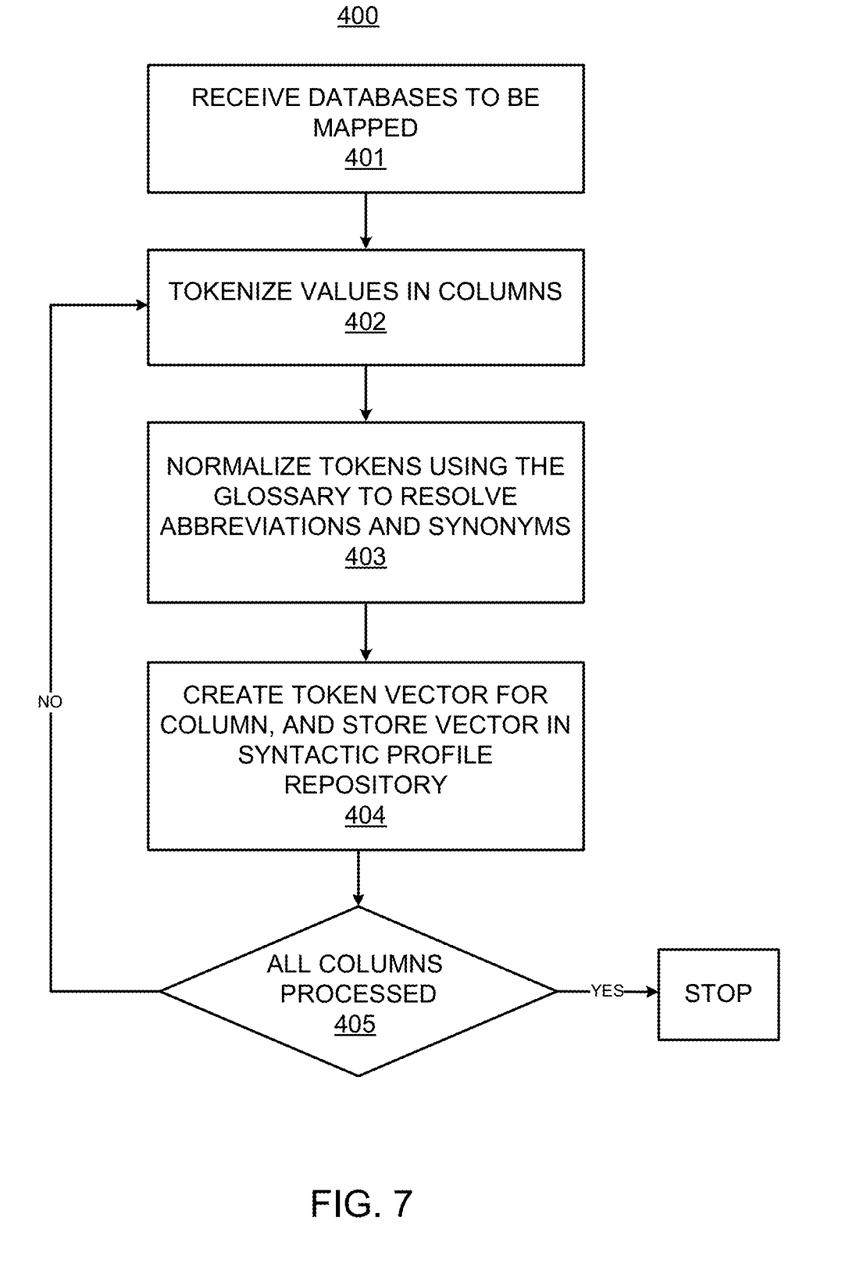
FIG. 7 illustrates a method for syntactic profiling, according to an embodiment.
Figure 8:
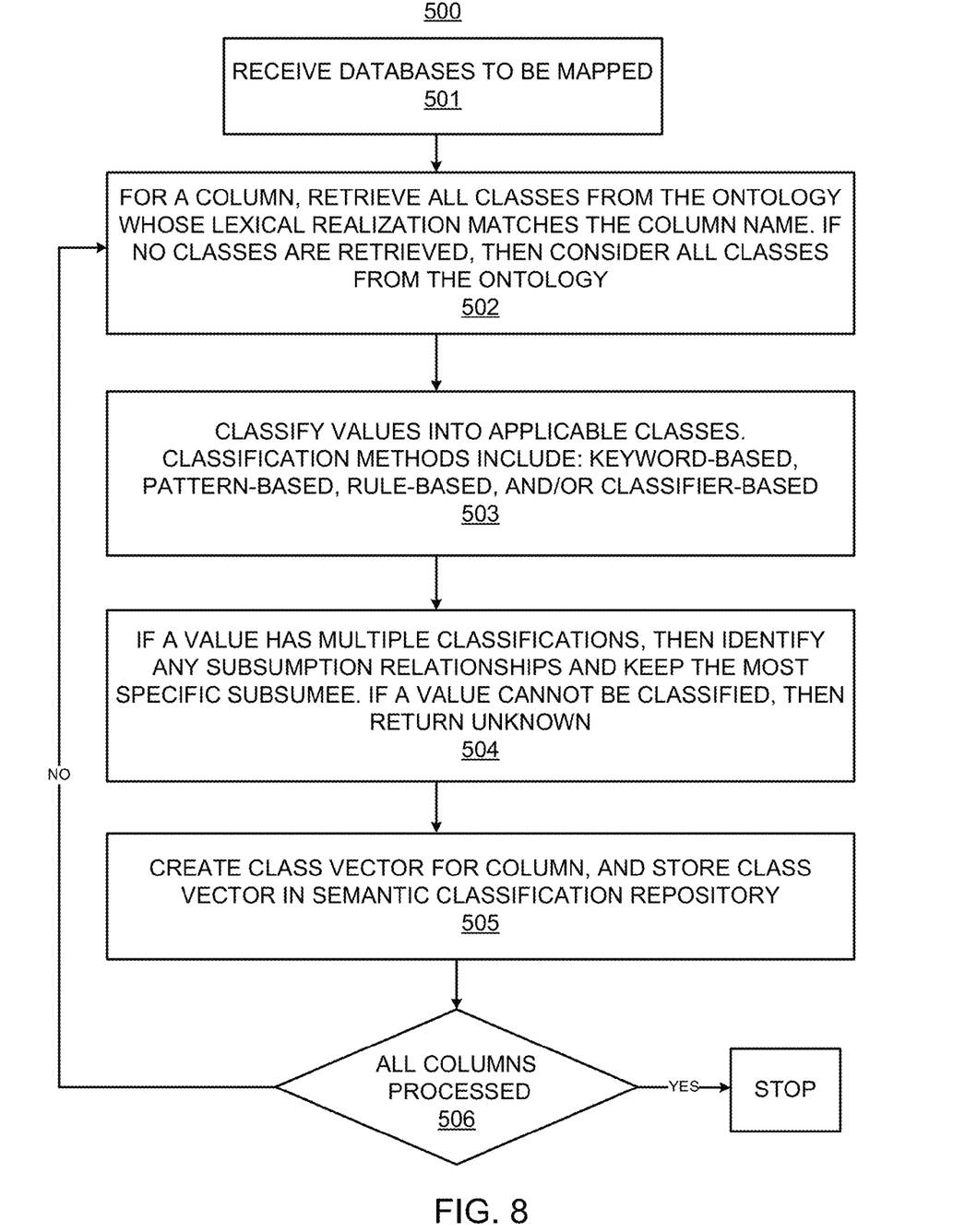
FIG. 8 illustrates a method for semantic classification, according to an embodiment.

FIG. 6 illustrates a flowchart of a method 300 for data mapping acceleration, according to an embodiment. FIG. 7 illustrates a flowchart of a method 400 for syntactic profiling, according to an embodiment. FIG. 8 illustrates a flowchart of a method 500 for semantic classification, according to an embodiment. The methods 300, 400 and 500 may be implemented on the data mapping acceleration system 100 described above with reference to FIGS. 1-5 by way of example and not limitation. The methods 300, 400 and 500 may be practiced in other systems.

For the method 300, referring to FIGS. 1 and 6, at block 301, the user interface module 101 may receive the databases 102 to be mapped. As described above, the databases 102 may generally include databases 1-N that may be mapped.

At block 302, the syntactic profile module 104 may generate syntactic profiles of the databases 102 that are to be mapped and store the syntactic profiles in the syntactic profile repository 105. As described above, the syntactic profiles may include token vectors. The syntactic profile module 104 may use glossaries from the glossary database 106. The glossaries may include, for example, abbreviations and synonyms, that may be used to normalize tokens of the database.

At block 303, the semantic classification module 107 may generate semantic classifications based on ontologies from an ontology database 108. The semantic classifications may be stored in the semantic classification repository 109. As described above, the semantic classifications may include class vectors.

At block 304, the syntactic profiles and semantic classifications respectively including the token and class vectors, may be analyzed by the similarity module 110 to map the databases 102 by determining, for example, a similarity between attributes of data from the databases 102 being mapped. The similarity module 110 may map the databases 102 and generate syntactic, semantic and overall scores representing, for example, a level of the mapping.

At block 305, the post processing module 111 may format the mappings based on user preferences, and forward the mapped databases as the data mapping results 103 to the user interface module 101 for display. An example of the display 120 of mapped databases is shown in FIG. 2, and described above.

Referring to FIGS. 1 and 7, the method 400 for syntactic profiling is described.

For the method 400, in order to generate syntactic profiles (i.e., block 302 of FIG. 6) that may be stored in the syntactic profile repository 105, at block 401, the databases 102 to be mapped may be received by the syntactic profile module 104.

At block 402, values in the columns of the databases may be tokenized. As discussed above, tokenization may include breaking a stream of text into words, phrases, symbols, or other meaningful elements called tokens.

At block 403, the tokens may be normalized using glossaries stored in the glossary database 106. The glossaries may include, for example, glossaries of abbreviations, synonyms etc. For example, values such as "US" and "USA" may be normalized to "US", or alternatively, "US" may be normalized to "USA" depending on user preferences.

At block 404, based on the tokenization and normalization, token vectors may be generated and stored in the syntactic profile repository 105.

At block 405, the syntactic profile module 104 may determine if all columns of the databases to be mapped are processed. If no, the system may return to block 402 for further processing. If yes, the system may stop further syntactic profiling and proceed to block 303 of FIG. 6.

Referring to FIGS. 1 and 8, the method 500 for semantic classification is described.

For the method 500, in order to generate semantic classifications (i.e., block 303 of FIG. 6) that may be stored in the semantic classification repository 109, at block 501, the databases 102 to be mapped may be received by the semantic classification module 107.

At block 502, for the columns of the database, classes from an ontology whose lexical realization matches the column name may be retrieved. If no classes are retrieved, then all classes from the ontology may be considered. For example, as discussed above with reference to FIG. 4, a class may include a life cycle realization, which may be the keywords that are used to identify the occurrence of that class. For a column in the database, the semantic classification module 107 may first determine if any classes have keywords that appear in the name of that column. If yes, then the class may be added to a list, and if not, that class may be bypassed. The semantic classification module 107 may thus filter the number of classes in an ontology to a smaller subset of classes. As discussed above, if no classes are retrieved, then all classes from the ontology may be considered. However, if classes that actually have keywords that appear in names of the columns are available, then subsequent steps may be restricted to only those classes.

At block 503, the semantic classification module 107 may classify the values into applicable classes. For example, if it is determined there are N classes that may be relevant based on the keyword names, then for each value, the module 107 may determine which of the classes each value belongs to. As discussed above, classification methods may include, for example, keyword-based, pattern-based, rule-based, and/or classifier-based methods.

At block 504, if a value has multiple classifications, the semantic classification module 107 may identify any subsumption relationships and retain the most specific subsumee. If a value cannot be classified, the module 107 may identify the value, for example, as unknown.

At block 505, based on the foregoing semantic classification procedures performed by the semantic classification module 107, class vectors may be generated and stored in the semantic classification repository 109.

At block 506, the semantic classification module 107 may determine if all columns of the databases to be mapped are processed. If no, the system may return to block 502 for further processing. If yes, the system may stop further semantic classification and proceed to block 304 of FIG. 6.

4. Computer Readable Medium

Figure 9:
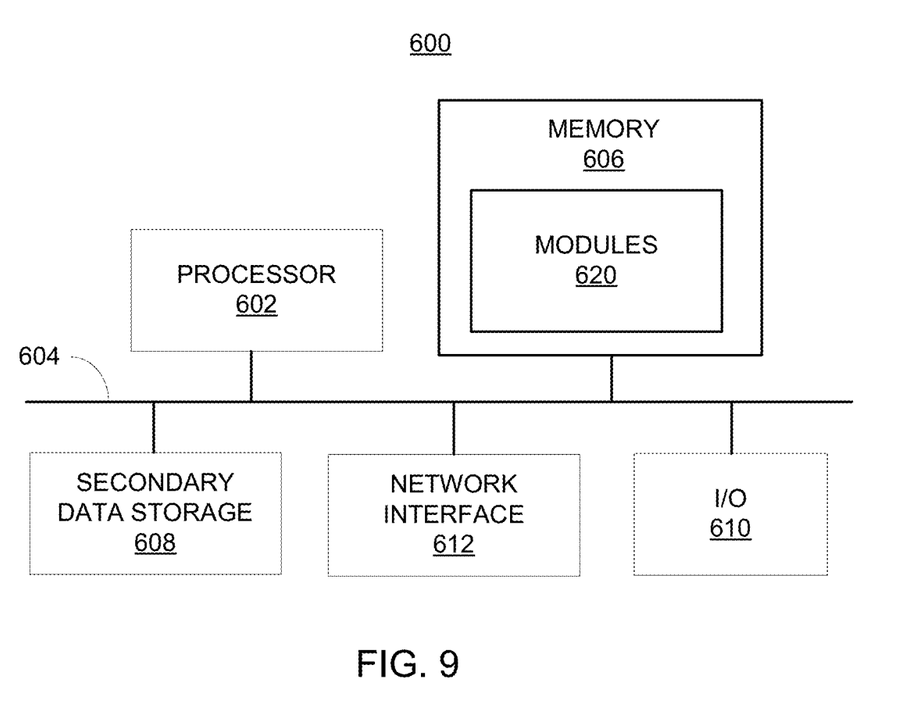
FIG. 9 illustrates a computer system, according to an embodiment.

FIG. 9 shows a computer system 600 that may be used with the embodiments described herein. The computer system 600 may represent a generic platform that may include components that may be in a server or another computer system. The computer system 600 may be used as a platform for the system 100. The computer system 600 may execute, by a processor or other hardware processing circuit, the methods, functions and other processes described herein. These methods, functions and other processes may be embodied as machine readable instructions stored on computer readable medium, which may be non-transitory, such as, for example, hardware storage devices (e.g., RAM (random access memory), ROM (read only memory), EPROM (erasable, programmable ROM), EEPROM (electrically erasable, programmable ROM), hard drives, and flash memory).

The computer system 600 may include a processor 602 that may implement or execute machine readable instructions performing some or all of the methods, functions and other processes described herein. Commands and data from the processor 602 may be communicated over a communication bus 604. The computer system 600 may also include a main memory 606, such as, for example, a random access memory (RAM), where the machine readable instructions and data for the processor 602 may reside during runtime, and a secondary data storage 608, which may be non-volatile and stores machine readable instructions and data. The memory and data storage may be examples of computer readable mediums. The memory 606 may include modules 620 including machine readable instructions residing in the memory 606 during runtime and executed by the processor 602. The modules 620 may include the modules 101, 104, 107, 110 and 111 of the system 100 shown in FIG. 1.

The computer system 600 may include an I/O device 610, such as, for example, a keyboard, a mouse, a display, etc. The computer system 600 may include a network interface 612 for connecting to a network. Other known electronic components may be added or substituted in the computer system 600.

While the embodiments have been described with reference to examples, various modifications to the described embodiments may be made without departing from the scope of the claimed embodiments.

What is claimed is:

1. A data mapping acceleration system comprising:
   a syntactic profile module, executed by a processor, to generate a syntactic profile of a data source to be mapped;
   a semantic classification module to generate a semantic classification of the data source by classifying values for a column of data from the data source by using an ontology that includes hierarchal classes, wherein a class of the hierarchal classes includes an attribute of including a lexical realization, and using classes from the ontology for which the lexical realization of the classes matches a column name of the column of the data; and
   a similarity module to evaluate the syntactic profile and semantic classification to determine an overall similarity between attributes of the data from the data source for mapping the data source.

2. A method for data mapping acceleration, the method comprising:
   generating, by a processor, a syntactic profile of a data source to be mapped;
   generating a semantic classification of the data source by classifying values for a column of data from the data source by using an ontology that includes hierarchal classes, wherein a class of the hierarchal classes includes an attribute of including a lexical realization, and using classes from the ontology for which the lexical realization of the classes matches a column name of the column of the data; and
   evaluating the syntactic profile and semantic classification to determine an overall similarity between attributes of the data from the data source for mapping the data source.

3. A non-transitory computer readable medium having stored thereon a computer executable program to provide data mapping acceleration, the computer executable program when executed causes a computer system to:
   generate, by a processor, a syntactic profile of a data source to be mapped;
   generate a semantic classification of the data source by classifying values for a column of data from the data source by using an ontology that includes hierarchal classes, wherein a class of the hierarchal classes includes an attribute of including a lexical realization, and using classes from the ontology for which the lexical realization of the classes matches a column name of the column of the data; and
   evaluate the syntactic profile and semantic classification to determine an overall similarity between attributes of the data from the data source for mapping the data source.

4. The system of claim 1, wherein the syntactic profile includes a token vector for a column of the data from the data source, and wherein the token vector includes the data separated from an original format into a tokenized format including at least one of words, phrases, and symbols.

5. The system of claim 1, wherein the overall similarity includes a component of a syntactic similarity and a semantic similarity.

6. The system of claim 1, wherein the class of the hierarchal classes further includes the attribute of including a classification type that is selected from pattern-based, keyword-based, rule-based, and classifier-based classification types.

7. The system of claim 1, wherein the similarity module is to determine a value representing the overall similarity by:
   determining a syntactic similarity by evaluating:
      tokens from a token vector for an attribute of the attributes;
      unique non-null tokens from the token vector for the attribute; and
      a number of times a token occurs in the attribute according to the token vector for the attribute.

8. The system of claim 1, wherein the similarity module is to determine a value representing the overall similarity by:
   determining a semantic similarity by evaluating:
      unique classes from a class vector for an attribute of the attributes; and
      a number of times a class occurs in the attribute according to the class vector for the attribute.

9. The system of claim 1, wherein the similarity module is to determine a value representing the overall similarity by:

applying a discount factor to a syntactic similarity based on a number of null values per column of the data; and applying another discount factor to a semantic similarity based a number of classes for a particular column of the data.

10. The method of claim 2, further comprising tokenizing values for a column of the data from the data source to determine the syntactic profile.

11. The method of claim 2, further comprising generating a token vector for a column of the data from the data source to determine the syntactic profile.

12. The method of claim 2, further comprising generating a class vector for a column of the data from the data source to determine the semantic classification.

13. The method of claim 2, wherein if a value of a column of the data from the data source includes multiple classifications that include a sub-class and super class relationship, the method further comprising identifying subsumption relationships and retaining a specific subsumee for determining the semantic classification.

14. The method of claim 2, wherein if a value of the column of the data from the data source cannot be classified, the method further comprising:

identifying a class of the ontology that constitutes a majority; and using the identified class to classify the value.

15. The system of claim 6, wherein the semantic classification module is to:

use the pattern-based classification to generate the semantic classification based on a pattern of values;

use the keyword-based classification to generate the semantic classification based on a comparison of keywords to values of the column of the data to determine whether a value matches a keyword;

use the rule-based classification to generate the semantic classification based on a classification of values of the column of the data based on pre-defined rules; and use the classifier-based classification to generate the semantic classification based on a classification of values of the column of the data based on previously determined classifications to determine a match.

16. The method of claim 10, wherein the tokenized values are designated tokens, the method further comprising using a glossary for normalizing the tokens.

\* \* \* \* \*